(12) United States Patent
Jacobsen et al.

(10) Patent No.: US 8,977,398 B2
(45) Date of Patent: Mar. 10, 2015

(54) MULTI-DEGREE OF FREEDOM TORSO SUPPORT FOR A ROBOTIC AGILE LIFT SYSTEM

(75) Inventors: Stephen C. Jacobsen, Salt Lake City, UT (US); John McCullough, Salt Lake City, UT (US); Marc X. Olivier, Salt Lake City, UT (US)

(73) Assignee: Sarcos LC, Salt Lake City, UT (US)

( * ) Notice: Subject to any disclaimer, the term of this patent is extended or adjusted under 35 U.S.C. 154(b) by 188 days.

(21) Appl. No.: 13/332,129

(22) Filed: Dec. 20, 2011

(65) Prior Publication Data

US 2012/0277915 A1  Nov. 1, 2012

Related U.S. Application Data

(60) Provisional application No. 61/481,095, filed on Apr. 29, 2011, provisional application No. 61/481,110, filed on Apr. 29, 2011, provisional application No. 61/481,103, filed on Apr. 29, 2011, provisional application No. 61/481,089, filed on Apr. 29, 2011, provisional application No. 61/481,099, filed on Apr. 29, 2011, provisional application No. 61/481,091, filed on Apr. 29, 2011.

(51) Int. Cl.
*B66C 23/00* (2006.01)
*B25J 9/16* (2006.01)
*B66C 1/04* (2006.01)
*B66C 1/68* (2006.01)
*H01F 7/04* (2006.01)
*B25J 5/00* (2006.01)
*B25J 9/00* (2006.01)

(52) U.S. Cl.
CPC . *B25J 9/162* (2013.01); *B66C 1/04* (2013.01); *B66C 1/68* (2013.01); *H01F 7/04* (2013.01); *B25J 5/007* (2013.01); *B25J 9/0084* (2013.01)
USPC ............................................. 700/264; 414/2

(58) Field of Classification Search
USPC ................ 700/264, 245, 247, 253, 258, 262; 74/479.01, 111, 144; 414/2–5; 318/568.12, 568.2, 568.21
See application file for complete search history.

(56) References Cited

U.S. PATENT DOCUMENTS 1,880,138 A  9/1932  Franz
3,280,991 A  10/1966  Melton et al.
(Continued)

FOREIGN PATENT DOCUMENTS

EP  0616275  9/1998
EP  1258324  11/2002
(Continued)

OTHER PUBLICATIONS

PCT/US2012/035553; filed Apr. 27, 2012; Raytheon; International Search Report dated Oct. 31, 2012.
(Continued)

*Primary Examiner* — Dalena Tran

(57) ABSTRACT

A controllable robotic arm system comprises a base unit and a moveable torso coupled to the base unit. The moveable torso is capable of moving in at least one degree of freedom independently of movement of the base unit. At least one robotic slave arm is moveably coupled to the torso. A master control system is operable to control the robotic slave arm and the moveable torso. The master control system includes an input interface by which a user can cause control signals to be communicated to the robotic slave arm and the moveable torso.

20 Claims, 6 Drawing Sheets

(56) References Cited

U.S. PATENT DOCUMENTS

| | | | |
|---|---|---|---|
| 4,046,262 A | 9/1977 | Vykukal et al. | |
| 4,179,233 A | 12/1979 | Bromell et al. | |
| 4,251,791 A | 2/1981 | Yanagisawa et al. | |
| 4,483,407 A | 11/1984 | Iwamoto et al. | |
| 4,567,417 A | 1/1986 | Francois et al. | |
| 4,591,944 A | 5/1986 | Gravel | |
| 4,661,032 A | 4/1987 | Arai | |
| 4,666,357 A | 5/1987 | Babbi | |
| 4,762,455 A | 8/1988 | Coughlan et al. | |
| 4,768,143 A | 8/1988 | Lane et al. | |
| 4,853,874 A | 8/1989 | Iwamoto et al. | |
| 4,883,400 A | 11/1989 | Kuban et al. | |
| 4,915,437 A | 4/1990 | Cherry | |
| 4,921,292 A | 5/1990 | Harwell et al. | |
| 4,997,095 A | 3/1991 | Jones et al. | |
| 5,004,391 A | 4/1991 | Burdea | |
| 5,038,089 A | 8/1991 | Szakaly | |
| 5,072,361 A | 12/1991 | Davis et al. | |
| 5,101,472 A | 3/1992 | Repperger | |
| 5,105,367 A | 4/1992 | Tsuchihashi et al. | |
| 5,239,246 A | 8/1993 | Kim | |
| 5,282,460 A | 2/1994 | Boldt | |
| 5,336,982 A | 8/1994 | Backes | |
| 5,399,951 A | 3/1995 | Lavallee et al. | |
| 5,797,615 A | 8/1998 | Murray | |
| 5,845,540 A | 12/1998 | Rosheim | |
| 5,949,686 A | 9/1999 | Yoshinada et al. | |
| 5,967,580 A | 10/1999 | Rosheim | |
| 5,994,864 A | 11/1999 | Inoue et al. | |
| 6,016,385 A | 1/2000 | Yee et al. | |
| 6,170,162 B1 | 1/2001 | Jacobsen et al. | |
| 6,272,924 B1 | 8/2001 | Jansen | |
| 6,301,526 B1 | 10/2001 | Kim et al. | |
| 6,338,605 B1 | 1/2002 | Halverson et al. | |
| 6,340,065 B1 | 1/2002 | Harris | |
| 6,360,166 B1 | 3/2002 | Alster | |
| 6,394,731 B1 | 5/2002 | Konosu et al. | |
| 6,430,473 B1 | 8/2002 | Lee et al. | |
| 6,507,163 B1 | 1/2003 | Allen | |
| 6,554,342 B1 | 4/2003 | Burnett | |
| 6,659,703 B1 | 12/2003 | Kirkley | |
| 6,663,154 B2 | 12/2003 | Pancheri | |
| 7,396,057 B2 | 7/2008 | Ye et al. | |
| 7,405,531 B2 | 7/2008 | Khatib et al. | |
| 7,409,882 B2 | 8/2008 | Massimo et al. | |
| 7,410,338 B2 | 8/2008 | Schiele et al. | |
| 7,783,384 B2 | 8/2010 | Kraft | |
| 7,862,524 B2 | 1/2011 | Carignan et al. | |
| 8,024,071 B2 | 9/2011 | Komatsu et al. | |
| 8,151,401 B2 | 4/2012 | Cheyne | |
| 8,452,447 B2* | 5/2013 | Nixon | 700/245 |
| 8,473,101 B2 | 6/2013 | Summer | |
| 8,529,582 B2* | 9/2013 | Devengenzo et al. | 606/130 |
| 8,560,118 B2 | 10/2013 | Greer et al. | |
| 2003/0152452 A1 | 8/2003 | Hodgson | |
| 2004/0037681 A1 | 2/2004 | Marcotte | |
| 2005/0193451 A1 | 9/2005 | Quistgaard et al. | |
| 2006/0149419 A1 | 7/2006 | Ogawa et al. | |
| 2006/0184275 A1 | 8/2006 | Hosokawa et al. | |
| 2006/0245897 A1 | 11/2006 | Hariki et al. | |
| 2007/0105070 A1* | 5/2007 | Trawick | 434/11 |
| 2007/0123997 A1 | 5/2007 | Herr et al. | |
| 2008/0281468 A1 | 11/2008 | Jacobsen et al. | |
| 2009/0038258 A1 | 2/2009 | Pivac et al. | |
| 2009/0039579 A1 | 2/2009 | Clifford et al. | |
| 2009/0210093 A1 | 8/2009 | Jacobsen et al. | |
| 2010/0089855 A1 | 4/2010 | Kjolseth | |
| 2010/0198402 A1 | 8/2010 | Greer et al. | |
| 2011/0046781 A1 | 2/2011 | Summer | |
| 2011/0071677 A1 | 3/2011 | Stilman | |
| 2012/0237319 A1 | 9/2012 | Jacobsen et al. | |

FOREIGN PATENT DOCUMENTS

| | | |
|---|---|---|
| JP | 52013252 | 2/1977 |
| JP | H01-295772 | 11/1989 |
| JP | H02-51083 | 4/1990 |
| JP | H03-85398 | 8/1991 |
| JP | HO4 44296 | 4/1992 |
| JP | 5004177 | 1/1993 |
| JP | H07-1366 | 1/1995 |
| JP | 7060679 | 3/1995 |
| JP | H07-112377 | 5/1995 |
| JP | HO7-31291 | 6/1995 |
| JP | H07-246578 | 9/1995 |
| JP | 9011176 | 1/1997 |
| JP | 11130279 | 5/1999 |
| JP | 2005/334999 | 12/2005 |
| WO | WO 2007/144629 | 12/2007 |
| WO | WO 2009/143377 | 11/2009 |

OTHER PUBLICATIONS

PCT/US2012/035570; filed Apr. 27, 2012; Raytheon Company; International Search Report dated Feb. 8, 2013.

PCT/US2012/038811; filed Apr. 27, 2012; Raytheon Company; International Search Report dated Feb. 13, 2013.

Barras; "Stabilization of a Biped Robot with its arms—A Practical Approach"; May 1, 2010; http://biorob.epfl.ch/files/content/sites/biorob/filed/users/170220/public/Report.pdf; retrieved on Jul. 10, 2013.

Moosavian, et al.; "Dynamics Modeling and Tip-Over Stability of Suspended Wheeled Mobile Robots with Multiple Arms"; Oct. 29, 2007; IEEE; pp. 1210-1215.

PCT/US2012/035609; filed Apr. 27, 2012; Raytheon Company; search report dated Jul. 29, 2013.

PCT/US2012/035620; filed Apr. 27, 2012; Raytheon Company; search report dated Jul. 7, 2013.

PCT/US2012/035592; filed Apr. 27, 2012; Raytheon Company; search report dated Aug. 2, 2013.

Bauman; Utah Firm Markets on Big Gorilla of an Arm; Deseret News; Jan. 27, 1993; 2 pages.

Jacobsen; Science, Robotics, and Superheroes; Presented at University of Utah's Science at Breakfast, Mar. 17, 2010; 16 pages.

Heavy-Duty Magnetic Base, 300 lb (1334 N) Holding Force, ¼-20Thread; Newport; http://search.newport.com/?q=*&x2=sku&q2=200; as accessed Apr. 23, 2011; 1 page.

Jacobsen et al; Research Robots for Applications in Artificial Intelligence, Teleoperation and Entertainment; The International Journal of Robotics Research; Apr.-May 2004; pp. 319-330; vol. 23, No. 4-5.

Kim et al; A Force Reflected Exoskeleton-Type Masterarm for Human-Robot Interaction; IEEE Transactions on Systems, Man and Cybertentics-Part A: Systems and Humans; Mar. 2005; pp. 198-212; vol. 35, No. 2.

Manipulator Dynamics; Amikabir University of Technology; Computer Engineering and Information Technology Department; Power Point; 44 pages.

Schuler et al; Dextrous Robot Arm; In Proceedings of the $8^{th}$ ESA Workshop on Advanced Space Technologies for Robotic and Automation; 'ASTRA 2004 ESTEC, Noordwijk, The Netherlands, Nov. 2-4, 2004; 8 pages.

Song et al; Kinematics Analysis and Implementation of a Motion-Following Task for a Humanoid Slave Robot Controlled by an Exoskeleton Master Robot; International Journal of Control, Automation and Systems; Dec. 2007; pp. 681-690; vol. 5, No. 6.

Tmsuk, Rescue Robot "T-53" release Control Technologies to Control the Synchronous Operation of the Arm; http://robot.watch.impress.co.jp/cda/news/2007/07/18/564.html; as accessed Sep. 1, 2011; 5 pages.

U.S. Appl. No. 13/332,138, filed Dec. 20, 2011; Stephen C. Jacobsen.
U.S. Appl. No. 13/332,146, filed Dec. 20, 2011; Stephen C. Jacobsen.
U.S. Appl. No. 13/332,152, filed Dec. 20, 2011; Stephen C. Jacobsen.
U.S. Appl. No. 13/332,160, filed Dec. 20, 2011; Stephen C. Jacobsen.
U.S. Appl. No. 13/421,612, filed Mar. 15, 2012; Stephen C. Jacobsen.
U.S. Appl. No. 13/332,165, filed Dec. 20, 2011; Stephen C. Jacobsen.

(56) References Cited

OTHER PUBLICATIONS

Yeates; Utah-Built Robot Safeguards the Workplace; http://www.ksl.com?nid=148&sid=17654421&autostart=y; Oct. 13, 2011; 3 pages.

Giant Robot Grabbing Hands Grab All They Can; Jul. 17, 2007; 3 pages; www.digitalworldtokyo.com/index.php/digital_tokyo/articles/giant_robot_grabbing_hands_grab_all_they_can/.

Industrial Magnetics, Inc.—PowerLift® Magnets; www.magnetics.com/product.asp?ProductID=1; 2 pages; as accessed Nov. 6, 2012.

Magnetic Base; www.ask.com/wiki/magnetic_base; 2 pages; page last updated Sep. 12, 2012.

PCT/US2012/035511; filed Apr. 27, 2012; Raytheon Company; International Search report dated Mar. 4, 2013.

U.S. Appl. No. 13/332,138, filed Dec. 20, 2011; Stephen C. Jacobsen; office action dated Mar. 10, 2014.

U.S. Appl. No. 13/332,160, filed Dec. 20, 2011; Stephen C. Jacobsen; office action dated Mar. 12, 2014.

U.S. Appl. No. 13/332,152, filed Dec. 20, 2011; Stephen C. Jacobsen; office action dated Mar. 28, 2014.

U.S. Appl. No. 13/332,160, filed Dec. 20, 2011; Stephen C. Jacobsen; notice of allowance mailed Jul. 8, 2014.

U.S. Appl. No. 13/332,146, filed Dec. 20, 2011; Stephen C. Jacobsen; office action dated Jul. 24, 2014.

U.S. Appl. No. 13/332,152, filed Dec. 20, 2011; Stephen C. Jacobsen; notice of allowance mailed Aug. 20, 2014.

U.S. Appl. No. 13/332,165, filed Dec. 20, 2011; Stephen C. Jacobsen; office action dated Jan. 7, 2015.

Aliens (Movie), Starring Sigourney, Weaver, Directed by James Cameron, Written by James Cameron, David Giler, Walter Hill, Dan O'Bannon, and Ronald Shuset, Released 1985 by Twentieth Century Fox, Scenes at Playtime 88:26:31-00:26:59 & 00:27:40-00:28:05 & 02:08:25-02:10:39 Non-Patent Literature documentation; Aliens (1986)—IMDb; downloaded Sep. 27, 2014; 4 pages; http://ww.imdb.com/title/tt10090605/.

U.S. Appl. No. 13/421,612, filed Mar. 15, 2012; Stephen C. Jacobsen; office action dated Oct. 7, 2014.

U.S. Appl. No. 13/332,138, filed Dec. 20, 2011; Stephen C. Jacobsen; Notice of Allowance mailed Oct. 10, 2014.

U.S. Appl. No. 13/332,146, filed Dec. 20, 2011; Stephen C. Jacobsen; office action dated Nov. 17, 2014.

* cited by examiner

MULTI-DEGREE OF FREEDOM TORSO SUPPORT FOR A ROBOTIC AGILE LIFT SYSTEM

PRIORITY DATA

This application claims the benefit of U.S. Provisional Application Ser. No. 61/481,095, filed Apr. 29, 2011, which is incorporated by reference herein in its entirety. This application also claims the benefit of U.S. Provisional Application Ser. Nos. 61/481,110, filed Apr. 29, 2011; 61/481,103, filed Apr. 29, 2011; 61/481,089, filed Apr. 29, 2011; 61/481,099, filed Apr. 29, 2011; and 61/481,091, filed Apr. 29, 2011, each of which are incorporated by reference herein in their entirety.

BACKGROUND

1. Field of the Invention

The present invention relates generally to the field of robotics.

2. Related Art

Manually lifting and moving heavy objects can be both time consuming and difficult work. Also, manually lifting or moving of heavy objects can result in physical strain or injury, particularly to the back. As a result, various types of lifting devices have been devised which assist in lifting and moving objects. These devices can save time and effort, as well as reduce or eliminate physical strain or injury caused by repeatedly lifting and moving heavy or cumbersome objects.

Exemplary conventional lifting devices include hoists, jacks, scaffolds and platform mechanisms. In some applications, forklifts, cranes, and other devices have been used to move boxes, machinery, or a myriad of other types of loads. Many lifting devices may perform one particular lifting function, but are not well suited for differing types of lifting functions. Some lift devices are large and bulky and can lift and move heavy loads, but may not be well suited for applications in which agility, maneuverability, or delicacy is desired. Other lift devices may be smaller and more maneuverable, but are not well suited for heavy loads.

In some applications, lift systems are used to lift or move loads with a weight great enough to unbalance the lift system. For example, a load may have to be held some distance away from a base of the lift system, thereby changing the center of balance of the system. Lift systems that are not anchored, or which do not include some form of stabilizer, can possibly overturn as a result of the changing center of balance, risking damage and injury to people and objects around the lift system. Conventional lift systems are not typically capable of dynamically balancing in response to shifting loads or perturbations to the lift system. Furthermore, conventional lift systems are unable to account for objects, surfaces, and the like that cause the system to shift relative to the load.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

DETAILED DESCRIPTION

Figure 1:
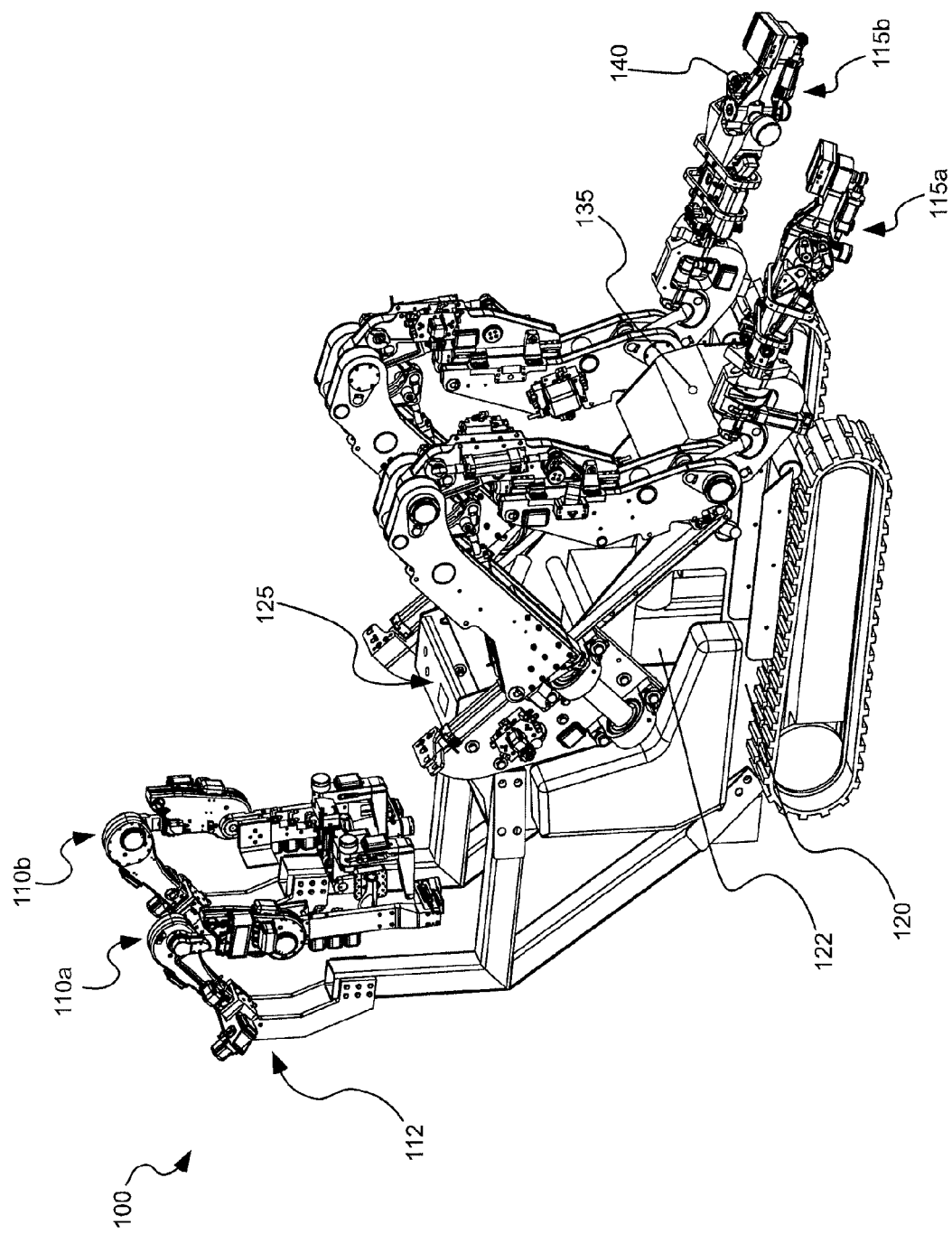
FIG. 1 is a perspective view of a controllable robotic lifting system in accordance with an embodiment of the invention.

The present invention is related to copending nonprovisional U.S. patent application Ser. No. 13/332,165, filed Dec. 20, 2011, and entitled, "Teleoperated Robotic System"; Ser. No. 13/332,152, filed Dec. 20, 2011, and entitled, "System and Method for Controlling a Tele-Operated Robotic Agile Lift System"; Ser. No. 13/332,138, filed Dec. 20, 2011, and entitled, "Platform Perturbation Compensation"; Ser. No. 13/332,146, filed Dec. 20, 2011, and entitled, "Robotic Agile Lift System with Extremity Control"; Ser. No. 13/332,160, filed Dec. 20, 2011, and entitled, "Variable Strength Magnetic End Effector for Lift Systems", each of which is incorporated by reference in its entirety herein.

As used herein, the singular forms "a," and, "the" include plural referents unless the context clearly dictates otherwise. Thus, for example, reference to "a robotic arm" includes one or more of such robotic arms and reference to a "degree of freedom" (DOF) includes reference to one or more of such DOFs (degrees of freedom).

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

As used herein, the terms "kinematically equivalent" or "kinematic equivalence" refer to a relationship between two or more separate systems of rigid bodies, wherein the rigid bodies of each system are linked by rotational joints to provide rotational degrees of freedom (DOF). Kinematically equivalent systems have similar corresponding rotational DOF, which are joined by similar corresponding linkages that are proportional in length between the systems. It is important to note that "equivalent" or "equivalence" does not refer to a kinematic identity between the systems. Indeed, "kinematically equivalent" or "kinematic equivalence" can include some degree of variation from true kinematic identity, as is illustrated further below and throughout the present disclosure.

Reference will now be made to certain examples, and specific language will be used herein to describe the same.

In accordance with one aspect of the invention, a controllable robotic arm system is provided, including a platform or base unit and a moveable torso, coupled to the base unit. The moveable torso can be capable of moving in at least one degree of freedom independently of movement of the base unit. At least one robotic slave arm can be moveably coupled to the torso. A master control system can be operable to control the robotic slave arm and the moveable torso, the master control system including an input interface by which a user can cause control signals to be communicated to the robotic slave arm and the moveable torso.

In accordance with another aspect of the invention, a controllable robotic arm system is provided, including a base unit and a moveable torso. The moveable torso can be coupled to the base unit and can be capable of moving in at least one degree of freedom. At least one robotic slave arm can be moveably coupled to the torso. A master control system can be operable to control the robotic slave arm and the moveable torso. The master control system can include an input interface by which a user can cause control signals to be communicated to the robotic slave arm and the moveable torso. The robotic slave arm can be controllable by the master control system to execute movement in at least one of seven degrees of freedom when the user causes control signals to be communicated to the robotic arm. The moveable torso can be controllable by the master control system to execute movement in at least one degree of freedom when the user causes control signals to be communicated to the moveable torso.

In accordance with another aspect of the invention, a controllable robotic arm system is provided, including a mobile base unit capable of autonomic tracked or wheeled movement. A moveable torso can be coupled to the base unit and can be capable of moving in at least two degrees of freedom independently of movement of the base unit. A pair of robotic slave arms can each be moveably coupled to the torso. A master control system can be operable to control the robotic slave arms and the moveable torso. The master control system can include an input interface by which a user can cause control signals to be communicated to each of the robotic slave arms and to the moveable torso.

Additional features and advantages of the invention will be apparent from the detailed description which follows, taken in conjunction with the accompanying drawings, which together illustrate, by way of example, features of the invention.

With these general examples set forth above, it is noted in the present disclosure that when describing the multi-degree of freedom torso support, or the related system or method, each of these descriptions are considered applicable to the other, whether or not they are explicitly discussed in the context of that embodiment. For example, in discussing the multi-degree of freedom torso support per se, the system and/or method embodiments are also included in such discussions, and vice versa.

Furthermore, various modifications and combinations can be derived from the present disclosure and illustrations, and as such, the following figures should not be considered limiting.

Illustrated generally in FIG. 1 is a controllable robotic arm lift system 100. The system can include at least one master control arm (in the example shown, two control arms are provided, 110a and 110b), which serve in this embodiment as the master control system. At least one slave arm (in the example shown, two slave arms are provided 115a and 115b) can be coupled to, and extend from, a platform 120. In use, a user manipulates the master control arm(s) to cause signals to be communicated to the slave arm(s) to control movement of the slave arm(s). The platform can be mobile, as shown in the figure, or fixed at a permanent location. In one aspect, the platform can be limited to providing support for the slave arms. In another aspect, the platform can provide support for the master control arms and for a teleoperator, or user, of the lift system. The ability of the platform to move provides the advantage that the mobile platform can be manipulated to allow the lift system to be moved from one place to another to position the slave arms in an optimal position for use.

In some embodiments, the user can be positioned on the platform, such that the user can directly see and hear the slave arms at work, as well as the workspace in which the slave arms operate. Visual and/or audio information can enable the user to accurately manipulate the master control arms to control movement of the slave arms. In another aspect, the user and master control arms (or other master control system) can be remotely located relative to the slave arms. In this case, the lift system can include a camera, microphone, or other instrument to convey visual and/or audio information to the remote user. While images and/or sounds are reproduced from the slave arm workspace, the user can manipulate the master control arms and control movement of the slave arms in the workspace.

The master control arm(s) can be configured to be manipulated by the user to control movement of a slave arm. For example, the user can grasp a handle located at a distal end of the master control arm 110a to manipulate the master control arm. In general, the master control arm can include joints and linkages that correspond to the user's arm, such that movement of the user's arm causes the master control arm to move in a manner similar to the user's movement. The slave arm can include joints and linkages that correspond to the master control arm and, thus, the user's arm as well. The movement of the master control arm can then cause the slave arm to move in a manner similar to the movement of the master control, thus allowing the user to control movement of the slave arm.

The master control arms 110a, 110b, as well as the slave arms 115a, 115b, can include actuators associated with the DOFs (Degrees of Freedom) of the arms. The actuators can be used to enable force reflection from the slave arm(s) to the master control arm(s). The actuators can also be used to enable gravity compensation of the arms. In one aspect, there is one actuator for each DOF of the arms. The actuators can be linear actuators, rotary actuators, and so forth. The actuators can be operated by electricity, hydraulics, pneumatics, and so forth.

In one aspect, the master control arm 110a can be kinematically equivalent to a user's arm from the shoulder to the wrist. A typical human arm includes seven degrees of freedom from the shoulder to the wrist. Specifically, a human shoulder includes three degrees of freedom: abduction/adduction, flex/extend, and humeral rotation. A human elbow includes one degree of freedom. A human wrist can be generalized to include three degrees of freedom: wrist rotation, abduction/adduction, and flex/extend. The upper arm extends from the shoulder and is connected to the lower arm by the elbow. The wrist is at the opposite end of the lower arm. The human arm from the shoulder to the wrist can thus be generalized as a kinematic system that includes a first joint having three rotational DOFs connected to a second joint having one DOF by a first linkage, which is connected to a third joint having three DOFs by a second linkage.

The master control arm 110a, and similarly the slave control arm 115a can be configured as a kinematic system to include DOFs and linkages that correspond to the DOFs and linkages of the human arm from the shoulder to the wrist. More specifically, the master and/or slave control arms can include seven degrees of freedom which can enable a user manipulating the master control arm to lift and/or manipulate objects using the slave arm in a similar fashion to how the user would otherwise lift or manipulate the object by hand. A base 112 for the master control arm(s) can be positioned behind the user, which can allow unrestricted movement of the user during use of the master control arm.

In one example, three separate joints of the master control arm can correspond to the single joint of the human shoulder in a kinematically equivalent system. In general, the DOFs of a portion of the master control arm corresponding to the human shoulder are the less sensitive DOFs in establishing kinematic equivalence between the master control arm and the user's arm, as compared to the DOFs of a portion of the master control arm corresponding to the human forearm.

In other words, the location and orientation of the DOFs of the master control arm corresponding to the human shoulder can tolerate the most variation from the corresponding user's arm and still provide kinematic equivalence with the user's arm. One joint of the master control arm can correspond to the human elbow joint, and three separate joints of the master control arm can correspond to the human wrist. The DOFs of the master control arm corresponding to the DOFs of the operator's wrist are the most sensitive and least tolerant of variation in establishing kinematic equivalence with the user's arm from the shoulder to the wrist. Therefore, in one aspect, the degree of permissible variation between kinematically equivalent systems can change from one end of a system to another.

In one aspect, the master control arms 110a, 110b can be arranged to provide space between the arms and the platform to provide the user with comfortable access to buttons, switches, levers, panels, or other control structures 125 to enable the user to control the lift system 100.

With further reference to FIG. 1, the system 100 can include position sensors on the master control arms 110a, 110b. The position sensors are associated with the DOFs of the master control arm. In one aspect, there is one position sensor for each DOF. The position sensors can be located, for example, at each of the joints. Because the DOF of the master control arm at these joints are rotational, the position sensors can be configured to measure angular position. For example, the position sensor may include an encoder, such as is disclosed in U.S. Pat. No. 6,170,162, which is incorporated herein by reference in its entirety.

Other types of encoders, and other types of position sensors, as will be apparent to one of ordinary skill in the art having possession of this disclosure, are also contemplated and are considered to be within the scope of this disclosure. In one aspect, the position sensors can detect a change in position of the master control arm at each DOF. This change in position can be used to cause a proportional change in position of the corresponding DOF of the slave arm 115a or 115b. The slave arm can similarly include position sensors for identifying and measuring angular rotations and positions. Using the position sensors, a precise position or orientation of any portion of the master or slave arms with respect to the platform 120 can be accurately determined.

The master control and slave arms 110a, 110b, 115a, 115b can also include force sensors associated with the DOFs of the arms. The force sensors can be used to measure force, for example, in the master control arm, which can be used to enable force reflection from the slave to the master control arm, or vice versa. The force sensors can also be used to enable gravity compensation of the arms.

In one aspect, there is one force sensor for each DOF of the arms. In another aspect, several DOFs of the master control arm can be accounted for with a multi DOF force sensor. For example, a multi-DOF force sensor capable of measuring force in at least four DOFs can be associated with an axis corresponding to an elbow DOF of the user. Additionally, single or multi-DOF force sensor can be associated in any combination with axes corresponding to the wrist DOFs of the user. Data from the multi DOF force sensors can be used to calculate the force at a degree of freedom between the force sensor location and the base 112. The force sensors can include any type of suitable load sensor. One example load sensor can utilize a strain gauge to calculate loads applied to any particular component of the system.

The system 100 can also include one or more gravity sensors. A gravity sensor may be located in a control unit 122 of the platform. In one aspect, the gravity sensor may be part of an inertial measurement unit (IMU). The IMU can measure and report a variety of inertia-related information, such as platform velocity, orientation, and gravitational forces. The IMU can include, for example, a combination of accelerometers and gyroscopes for measuring the inertial information. While multiple gravity sensors or IMUs may be employed in the system, such as having sensors at linkages in the master 110a, 110b or slave 115a, 115b arms, a single sensor may also be sufficient. For example, the control unit can track the angular rotations of a slave arm using the position sensor(s). The control unit can accurately determine gravitational forces, torque, and the like at each slave arm segment or joint by using the position information from the sensors and the inertial information from the IMU in combination.

The master control arms 110a, 110b and the slave arms 115a, 115b can have a variety of operating modes. These operating modes can be selected by a user using the user controls 125 and implemented using the control unit 122 to adjust a position of one or more of the slave arms. The system 100 can include additional global positioning system (GPS) devices, electromagnetic beam radiation emitters 135, electromagnetic or electrostatic field emitters 140, and a variety of other devices and components for assisting in perturbation compensation, which will be described in additional detail below.

While this disclosure primarily discusses example implementations of master and slave arms, the principles of slave arm control can be executed using a variety of master control systems, as would be appreciated by one of ordinary skill in the art having possession of this disclosure. As a broad example, a platform having a simple joystick master control system can be used to control a slave mechanical arm with at least one DOF.

The principals of operation of the lift system provided above are merely exemplary features of the invention can vary depending upon the intended use of the lift system, the complexity of functionality required, etc. For a more detailed description of the capability and function of the master control and slave arms shown, the reader is directed to the applications listed in the Priority Data section above. As indicated above, each of these applications is incorporated by reference into the present disclosure in their entirety.

Figure 2:
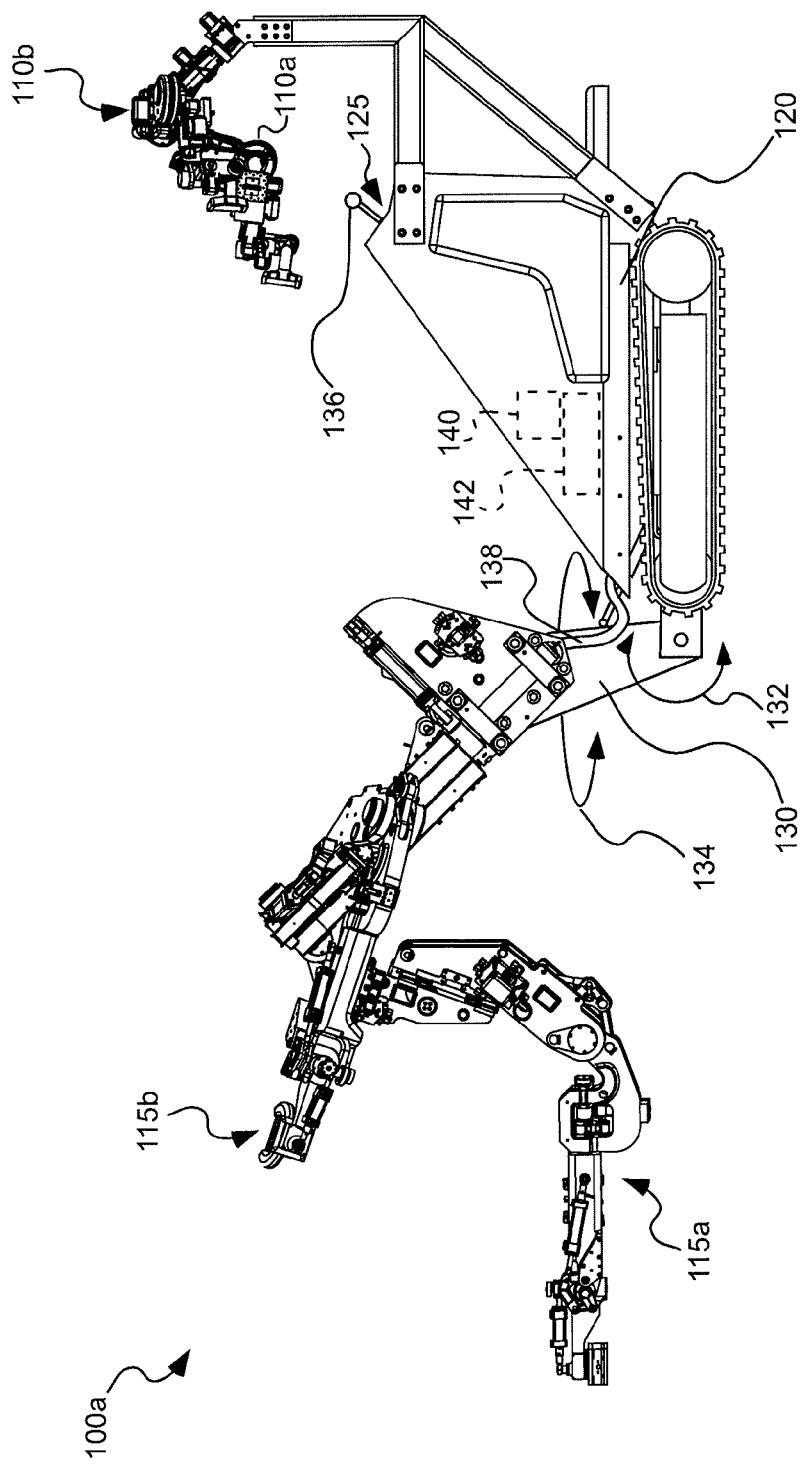
FIG. 2 is a side view of a controllable robotic lifting system having a moveable torso integrated therewith.

Turning now to FIG. 2, an alternate embodiment of the invention is illustrated that includes a controllable robotic arm system 100a that can include a base unit or platform 120. A moveable torso 130 can be coupled to the base unit and can be capable of moving in at least one degree of freedom independently of movement of the base unit 120. In the example shown, the moveable torso 130 is capable of being moved in two degrees of freedom: it can pivot forward and aft as shown by directional indicator 132, and it can rotate as shown by directional indicator 134. The system can include at least one robotic slave arm 115a, 115b that can be moveably coupled to the torso 130.

A master control system can be operable to control the robotic slave arm 115a and/or 115b and the moveable torso. The master control system can include an input interface by which a user can cause control signals to be communicated to each of the robotic slave arms 115a and/or 115b and the moveable torso 130. In the example shown, the input interface includes master control arms 110a, 110b, as well as control panel 125 (which is shown including, for example, joystick controller 136). Power and communication bundle 138 can provide power to the slave arms (in the form of electric power, or pressurized hydraulic fluid, pneumatic pressure, etc.). The power and communication bundle can also include wiring to provide communication signals between the master control system and the slave arms 115a and/or 115b.

As the slave arms 115a, 115b are coupled to the moveable torso 130, the system can advantageously be used to position the slave arms 115a and/or 115b in a variety of positions prior to (or during) operation of the slave arms. In this manner, the moveable torso 130 can be pivoted upwardly for operations which can benefit from having the arms initially placed in an elevated position. Similarly, the moveable torso 130 can be pivoted downwardly for operations which can benefit from having the arms initially place in a lowered position.

The moveable torso 130 can also allow an operator to pull alongside a work area and rotate the arms to the left or right of the base unit or platform 120 for better access to work locations positioned against a wall, near a large truck or other vehicle, etc. The moveable torso provides the system with more flexibility in carrying out work with the slave arms than is possible with the slave arms 115a and/or 115b being coupled directly to the platform 120.

In addition, the moveable torso 130 can enable more compact storage of the unit when not in use, or when being transported as a unit. When it is desired to place the system into a compact mode for storage, the moveable torso can be tilted as far aft as possible (e.g., as far to right of FIG. 2 as possible), and the slave arms 115a, 115b can be folded in upon themselves to provide a very compact configuration for storage or transport.

The moveable torso 130 and slave arms 115a and/or 115b can be actuated in a number of manners. In one example, they are each powered by hydraulic actuators that are supplied with pressurized hydraulic fluid via, for example, a conventional hydraulic pump (schematically illustrated at 140 in FIG. 2). The hydraulic pump can be powered in a number of manners, one being an internal combustion engine (schematically illustrated at 142 in FIG. 2). The internal combustion engine can be of the type known in the art, and can require various control systems, fuel supply, exhaust system, etc. None of these components are illustrated in detail, as they could be readily incorporated into the present system by one of ordinary skill in the art having possession of this disclosure.

Similarly, the interaction between the internal combustion engine (or other primary power source) and the hydraulic pump (or other secondary power source) is not shown or described in detail in this disclosure. The various manners in which such systems can be intercoupled are known to those in such fields of endeavor.

Figure 3:
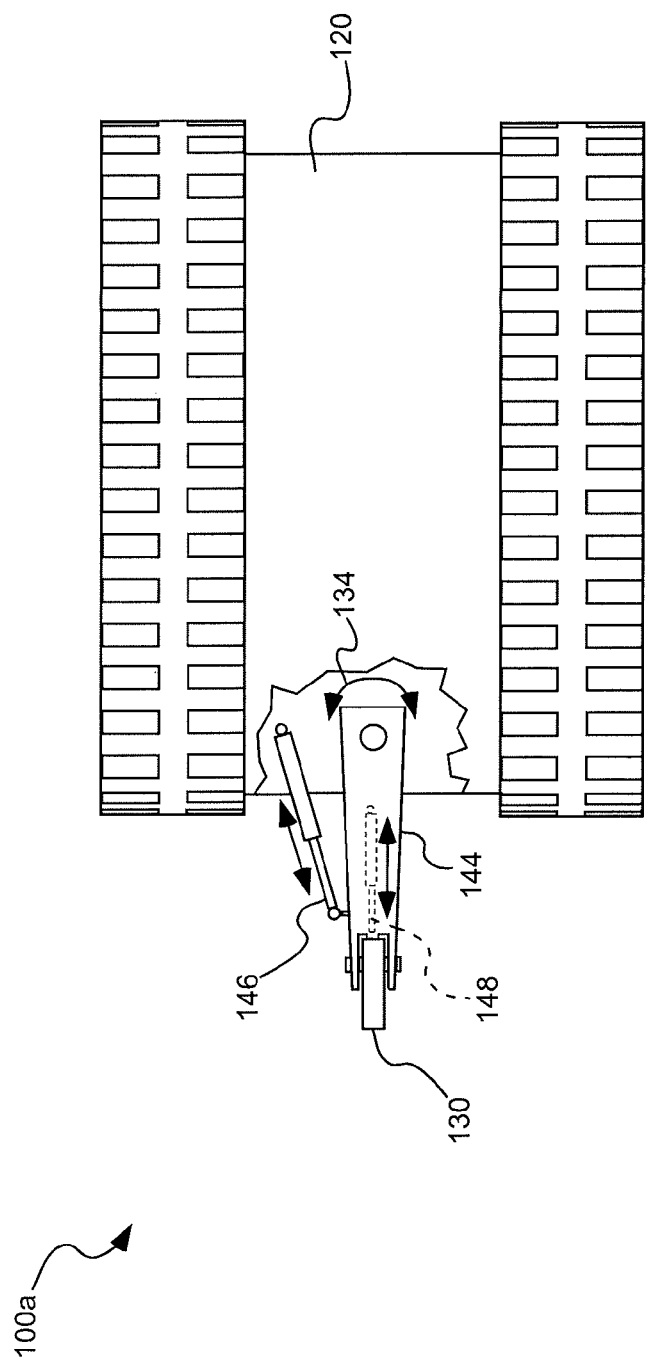
FIG. 3 is a side view of another example of a controllable robotic lifting system having a moveable torso integrated therewith.

FIG. 3 illustrates one exemplary manner in which the hydraulic system 100a can be used to actuate the moveable torso 130 of FIG. 2. In this aspect, the moveable torso 130 can be pivotally coupled to a boom 144 that is pivotally coupled to the platform 120. A hydraulic actuator 146 can be pivotally coupled to both the boom 144 and the platform 120. Extension and retraction of the actuator 146 causes the boom 144 (and thus the moveable torso 130) to rotate as shown by directional indicator 134 (which corresponds to directional indicator 134 in FIGS. 2, 4 and 5). In a similar manner, actuator 148 can be pivotally coupled to the boom 144 and the torso 130. Extension and retraction of the actuator 148 causes the torso 130 to pivot forward and aft relative to the platform 120 (as indicated by directional indicator 132 in FIG. 2).

In this manner, the moveable torso 130 is capable of moving in at least two degrees of freedom, independently of movement of the base unit 120 and independently of movement of the slave arms 115a and/or 115b. The torso 130 can be rotatable about an axis of rotation that is substantially perpendicular to a plane defined by the base unit or platform (e.g., about an axis of rotation perpendicular to the plane of the page of FIG. 3). The torso can also be pivotal about an axis substantially parallel to a plane defined by the base unit or platform (e.g., about an axis of rotation perpendicular to the plane of the page of FIG. 2).

While actuation of the various components herein is often described with reference to hydraulic actuators, it is understood that a variety of other suitable actuators could also be used. These include, without limitation, pneumatic actuators, electric actuators, and the like.

Figure 4:
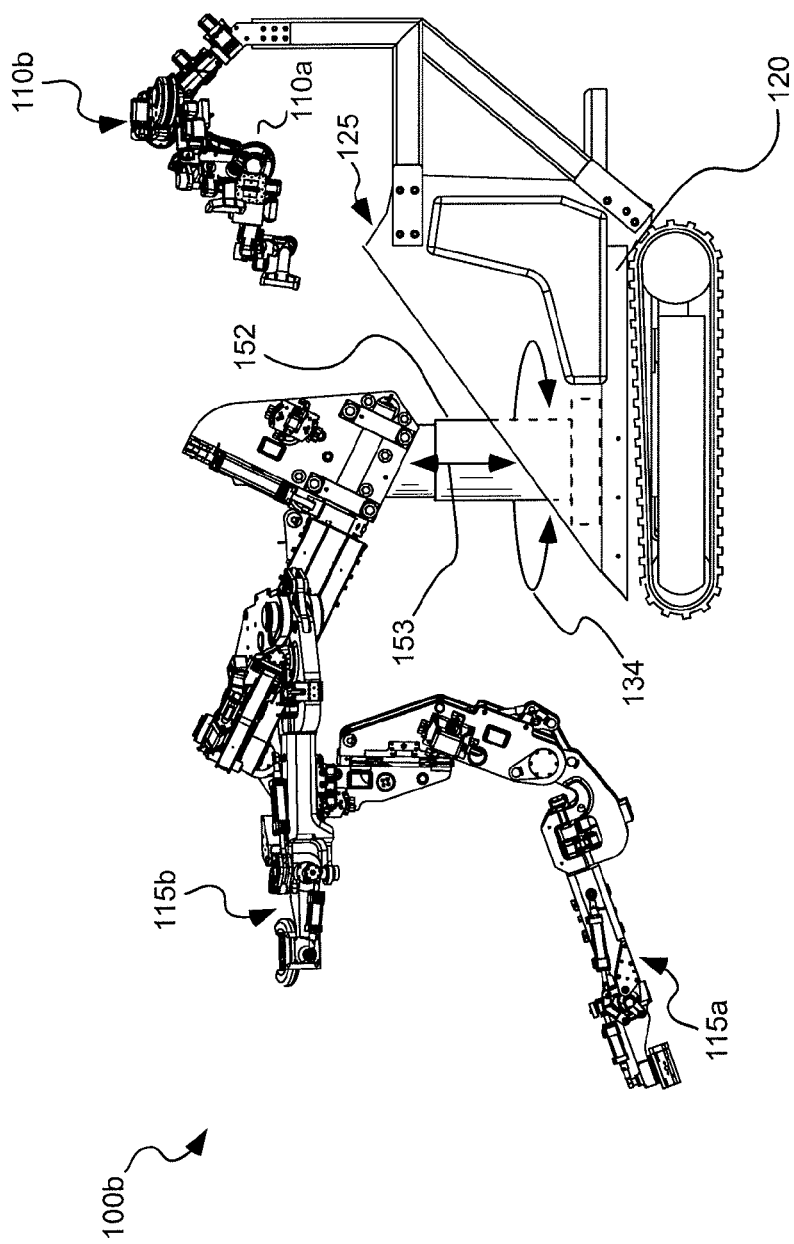
FIG. 4 is a bottom, partially sectioned view of the base unit of the lifting system of FIG. 2 (note that some features of the upper section of the lifting system are omitted in the interest of clarity)

Turning now to FIG. 4, an alternate lifting system 100b is shown. In this embodiment, the moveable torso 152 comprises a substantially cylindrical torso that is capable of rotating relative to the platform or base unit 120 (e.g., about directional indicator 134) and is capable of moving upwardly and downwardly relative to the platform or base unit (e.g., along directional indicator 153). In this manner, the slave arms 115a and 115b can be raised or lowered relative to the base, as well as rotated about the base, prior to (or during) operation of the arms.

Figure 5:
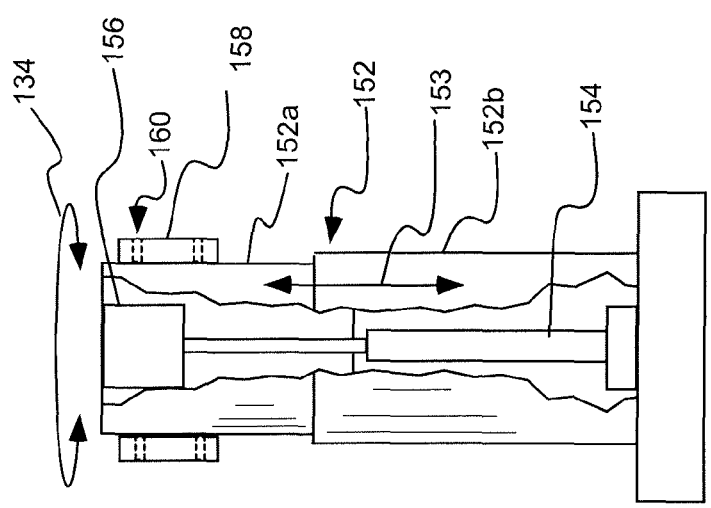
FIG. 5 is a partially sectioned view of the moveable torso of the lifting system of FIG. 3.

FIG. 5 illustrates an exemplary manner in which moveable torso 152 can be actuated. In one example, the torso can include two concentric shells 152a, 152b, which can telescope one within another along directional indicator 153 to allow the overall height of the torso to be adjusted. Actuator 154 can be coupled to the shells such that extension and retraction of the actuator 154 results in the shells 152a and/or 152b moving further away from one another, or closer to one another, respectively (the shells 152a and/or 152b are shown in a nearly fully extracted condition).

Rotation of the torso 152 in direction 134 can be accomplished in a number of ways that would be readily appreciated by one of ordinary skill in the art having possession of this disclosure. In one example, a helical or rotary actuator 156 can be coupled to the upper shell 152a and to the linear actuator 154. The rotary actuator can be energized to cause the upper shell portion 152a to rotate relative to the lower shell portion 152b. A pair of shoulder plates 158 can be coupled to the upper shell portion 152a. The shoulder plates can include coupling ports 160 to facilitate attachment of the slave arms 115a, 115b to the cylindrical torso 152.

As described above, the platform or base unit 120 can be mobile and can be capable of autonomic movement (under control of the user). Mobility can be provided to the platform or base unit in a number of manners. In the embodiments illustrated in the figures, a track system is utilized. Such track systems are known in the art, and a variety of common configurations can be utilized. In addition to track systems, the base unit or platform can be provided with a plurality of wheels for wheeled mobility. A variety of wheeled configurations can be utilized, as would be appreciated by one of ordinary skill in the art having possession of this disclosure.

Figure 6:
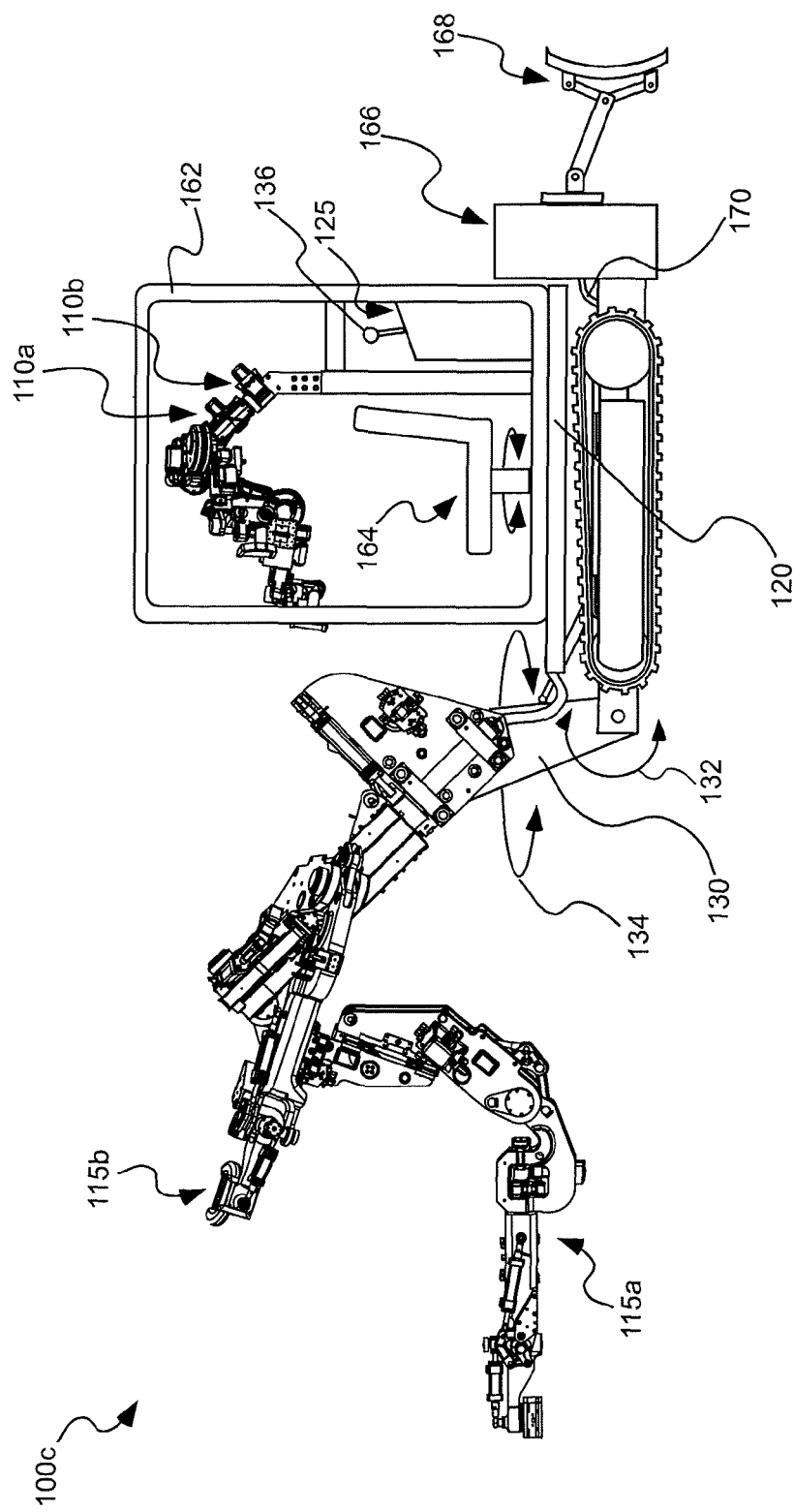
FIG. 6 is a side view of a controllable robotic lifting system incorporated into a multi-use riding vehicle that includes an auxiliary attachment operably coupled thereto.

Turning now to FIG. 6, in one aspect of the invention, the slave arms 115a, 115b and master control arms 110a, 110b can be incorporated into a rideable system 100c that includes the capability of coupling additional or auxiliary power attachments to the platform or base unit 120. In the example, shown, a grading or plowing attachment 168 is removably attached to one end of the rideable system, while the moveable torso 130 (and thus, the slave arms) extends from the other end. The operator can be positioned in seat 164, which in one embodiment can swivel, allowing the operator to alternate between operation of the slave arms 115a and/or 115b and the auxiliary power attachment 168. A safety cage 162 can at least partially surround the operator while he or she is seated to protect the operator during operation of the vehicle.

A power takeoff unit 166 can allow the use of interchangeable, and removably attachable, power attachments with the rideable system. In addition to the plow/grader attachment shown, a variety of useful attachments can be interchanged, including, without limitation, augers, trenchers, diggers, wire pullers, reel carriers, backhoes, saws, and the like. The power takeoff unit can be powered in much the same way as the slave arms 115a and/or 115b, with communication and power being provided to the power takeoff assembly by bundle 170.

While the foregoing examples are illustrative of the principles and concepts discussed herein, it will be apparent to those of ordinary skill in the art that numerous modifications in form, usage and details of implementation can be made without the exercise of inventive faculty, and without departing from those principles and concepts. Accordingly, it is not intended that the principles and concepts be limited, except as by the claims set forth below.

What is claimed is:

1. A controllable robotic arm system, comprising:
a mobile base unit;
a moveable torso, coupled to the base unit and being capable of moving in at least one degree of freedom independently of movement of the base unit;
at least one robotic slave arm, moveably coupled to the torso; and
a master control system, operable to control the robotic slave arm, the moveable torso, and the mobile base unit, the master control system including a user input interface supported about the base unit by which a user can cause control signals to be communicated to the robotic slave arm, the moveable torso, and the mobile base unit.

2. The system of claim 1, wherein the moveable torso is capable of moving in at least two degrees of freedom independently of movement of the base unit.

3. The system of claim 2, wherein the moveable torso is rotatable about an axis of rotation substantially perpendicular to a plane defined by the base unit.

4. The system of claim 2, wherein the moveable torso is pivotal about an axis substantially parallel to a plane defined by the base unit.

5. The system of claim 1, wherein the moveable torso is extendable relative to the base unit, to allow height adjustment of the torso.

6. The system of claim 1, wherein the base unit is mobile.

7. A controllable robotic arm system, comprising:
a mobile base unit;
a moveable torso, coupled to the base unit and being capable of moving in at least one degree of freedom;
at least one robotic slave arm, moveably coupled to the torso; and
a master control system, operable to control the robotic slave arm and the moveable torso, the master control system including a user input interface supported about the mobile base unit by which a user can cause control signals to be communicated to the robotic slave arm, the moveable torso, and the mobile base unit,
wherein the robotic slave arm is controllable by the master control system to execute movement in at least one degree of freedom when the user causes control signals to be communicated to the robotic arm,
and wherein the moveable torso is controllable by the master control system to execute movement in at least one degree of freedom when the user causes control signals to be communicated to the moveable torso.

8. The system of claim 7, wherein the moveable torso is rotatable about an axis of rotation substantially perpendicular to a plane defined by the base unit.

9. The system of claim 7, wherein the moveable torso is pivotal about an axis substantially parallel to a plane defined by the base unit.

10. The system of claim 7, wherein the moveable torso is extendable relative to the base unit, to allow height adjustment of the torso.

11. The system of claim 7, wherein the base unit is mobile.

12. The system of claim 11, wherein the base unit includes a plurality of wheels that provide wheeled mobility to the base unit.

13. The system of claim 11, wherein the base unit includes a track assembly that provides tracked mobility to the base unit.

14. A controllable robotic arm system, comprising:
a mobile base unit capable of autonomic tracked or wheeled movement;

a moveable torso, coupled to the base unit and being capable of moving in at least two degrees of freedom independently of movement of the base unit;

a pair of robotic slave arms, each moveably coupled to the torso; and a master control system, operable to control the robotic slave arms, the moveable torso, and the mobile base unit, the master control system including a user input interface supported about the mobile base unit by which a user can cause control signals to be communicated to the robotic slave arms, the moveable torso, and the mobile base unit.

15. The system of claim 14, wherein the moveable torso is rotatable about an axis of rotation substantially perpendicular to a plane defined by the mobile base unit.

16. The system of claim 14, wherein the moveable torso is pivotal about an axis substantially parallel to a plane defined by the mobile base unit.

17. The system of claim 14, wherein the moveable torso is extendable relative to the base unit, to allow height adjustment of the torso.

18. The system of claim 14, wherein the base unit includes an auxiliary power attachment operably coupled thereto.

19. The system of claim 18, further comprising a rotatable seat, coupled to the base unit, the rotatable seat allowing an operator to swivel into different operating positions to alternate between operating the robotic slave arms and the auxiliary power attachment.

20. The system of claim 18, wherein the auxiliary power attachment is selected from the group consisting essential of an auger, a backhoe, a saw, a trencher, a plow, a grader, and a reel carrier.

* * * * *